(12) United States Patent
Honda

(10) Patent No.: US 7,756,013 B2
(45) Date of Patent: *Jul. 13, 2010

(54) PACKET SWITCHING SYSTEM AND METHOD

(75) Inventor: Masahiko Honda, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 887 days.

This patent is subject to a terminal disclaimer.

(21) Appl. No.: 11/467,478

(22) Filed: Aug. 25, 2006

(65) Prior Publication Data

US 2006/0285488 A1 Dec. 21, 2006

Related U.S. Application Data

(63) Continuation of application No. 09/825,941, filed on Apr. 5, 2001, now Pat. No. 7,116,633.

(30) Foreign Application Priority Data

Apr. 6, 2000 (JP) ............................. 2000-104707

(51) Int. Cl.
*G01R 31/08* (2006.01)
*H04L 12/50* (2006.01)
*H04L 12/28* (2006.01)

(52) U.S. Cl. .................. 370/218; 370/386; 370/422

(58) Field of Classification Search ......... 370/216–220, 370/355, 356, 358, 360, 386, 389, 396, 398, 370/422, 22, 227–229, 381, 383, 395.21, 370/395.42, 412, 413, 443, 444

See application file for complete search history.

(56) References Cited

U.S. PATENT DOCUMENTS

| 5,398,235 | A | * | 3/1995 | Tsuzuki et al. ............... 370/219 |
| 5,459,724 | A | | 10/1995 | Jeffrey et al. |
| 5,459,816 | A | * | 10/1995 | Basehore et al. .............. 700/50 |
| 5,602,844 | A | * | 2/1997 | Lyles .................... 370/395.31 |
| 6,091,709 | A | | 7/2000 | Harrison et al. |
| 6,269,077 | B1 | | 7/2001 | Matsumura et al. |
| 6,400,718 | B1 | | 6/2002 | Yamada et al. |

(Continued)

FOREIGN PATENT DOCUMENTS

| EP | 888027 A2 | * | 12/1998 |
| JP | 2-246646 | | 10/1990 |

(Continued)

*Primary Examiner*—Seema S Rao
*Assistant Examiner*—Samina Choudhry
(74) *Attorney, Agent, or Firm*—Harrity & Harrity, LLP

(57) ABSTRACT

A packet switching system capable of ensuring the sequence and continuity of packets and further compensating for delays in transmission is disclosed. Each of two redundant switch sections has a high-priority queue and a low-priority queue for each of output ports. A high-priority output selector selects one of two high-priority queues corresponding to respective ones of the two switch sections to store an output of the selected one into a high-priority output queue. A low-priority output selector selects one of two low-priority queues corresponding to respective ones of the two switch sections to store an output of the selected one into a low-priority output queue. The high-priority and low-priority output selectors are controlled depending on a system switching signal and a packet storing status of each of the high-priority and low-priority queues.

21 Claims, 6 Drawing Sheets

U.S. PATENT DOCUMENTS

| | | | |
|---|---|---|---|
| 6,430,153 | B1 | 8/2002 | Hughes et al. |
| 6,487,169 | B1 | 11/2002 | Tada |
| 6,535,479 | B1 | 3/2003 | Ikematsu |
| 6,563,837 | B2 | 5/2003 | Krishna et al. |
| 6,667,959 | B1 | 12/2003 | Hebb et al. |
| 6,721,324 | B1 | 4/2004 | Shinohara |
| 6,738,381 | B1 | 5/2004 | Agnevik et al. |
| 2001/0050916 | A1 | 12/2001 | Krishna et al. |
| 2003/0072316 | A1 | 4/2003 | Niu et al. |

FOREIGN PATENT DOCUMENTS

| | | |
|---|---|---|
| JP | 5-7213 | 1/1993 |
| JP | 6-6372 | 1/1994 |
| JP | 11-17696 | 1/1999 |

* cited by examiner

PACKET SWITCHING SYSTEM AND METHOD

This application is a continuation of U.S. patent application Ser. No. 09/825,941 filed Apr. 5, 2001 now U.S. Pat. No. 7,116,633, which is hereby incorporated by reference.

BACKGROUND OF THE INVENTION

1. Field of the Invention

The present invention relates to packet switching techniques, and in particular to packet switching system and method ensuring traffic quality.

2. Description of the Related Art

LANs (local-area networks) and IP (Internet Protocol)-based private networks have been widely used in companies and universities and are undergoing further development to carrier-class public networks. As the demands for telephony traffic and online trading transactions are growing, real-time and reliable traffic transfer becomes more important. In such a background, there have been proposed packet switching techniques allowing Quality of Service (QoS) guarantees to be maintained.

An ATM (asynchronous transfer mode) cell switching system guaranteeing the sequence and continuity of cells has been disclosed in Japanese Patent Application Unexamined Publication No. 5-7213. More specifically, the conventional switching system is provided with working and reserved ATM cell switches, which are selectively connected to an outgoing line by a system selector. When the working ATM cell switch is switched to the reserved ATM cell switch, the system switching is performed after all the cells staying in the working ATM cell switch have been completely forwarded to the outgoing line. This cell switching technique can be also applied to IP packet switching systems.

In the case of traffic flows requiring real time with little delay, it is necessary to pass the packets through the switch in relatively short time. On the other hand, some traffic flows that do not necessitate real time may be permitted to be transferred with relatively long delay.

According to the above-described prior art (Japanese Patent Application Unexamined Publication No. 5-7213), however, the system switching from the working ATM cell switch to the reserved ATM cell switch is performed after all the cells abiding in the working ATM cell switch have been completely forwarded to the outgoing line. Therefore, traffic requiring real time is kept waiting in the reserved ATM cell switch until the working ATM cell switch have completely forwarded the abiding cells to the outgoing line. This may not ensure required QoS.

In general, in the case of real-time traffic, an end terminal is provided with a buffer for absorbing variations in arrival time of packets. However, it is necessary for packets to arrive within a predetermined delay time. For example, telephone conversation cannot be don smoothly without limiting a delay time to at most several hundred milliseconds. If a packet is delayed by a time interval longer than an absorbable time period, then the packet is assumed not to arrive and is interpolated, or equivalently loss of packet.

SUMMARY OF THE INVENTION

One aspect may be directed to a redundant system having two switch routes. The system may include a plurality of input selectors, each for receiving an input line and for connecting the received input line to one of the two switch routes. The system may further include a switch section for each one of the two switch routes, each of the switch sections having N input ports and N output ports, and N buffers that each further include M, with M greater than or equal to two, priority queues for storing data units having different priorities; and an output selector for selecting from the M priority queues from the N buffers of one of the two switch sections.

Another aspect may be directed to a data unit switching system having two switch routes. The system includes a plurality of input selectors for connecting input lines to one of the two switch routes; and a switch section provided for each of the two switch routes, each of the switch sections having N input ports and N output ports and comprising N buffers. Each of the N buffers may further include a high-priority queue for storing input data units having a high priority, and a low-priority queue for storing input data units having a low priority.

Yet another aspect may be directed to a switching system comprising a plurality of input selector switches each configured to be connected to an input line. The system may further include a first switch section and a second switch section connected to the plurality of input selector switches, one of the first switch section or the second switch section receiving data units from the plurality of input selector switches. The first and second switch sections each may include a buffer corresponding to each of the input selector switches, each of the buffers further including a plurality of priority queues for storing different priority data units from corresponding ones of the input selector switches; and output selectors configured to receive data units output from the first and second switch sections.

DESCRIPTION OF THE PREFERRED EMBODIMENT

Figure 1:
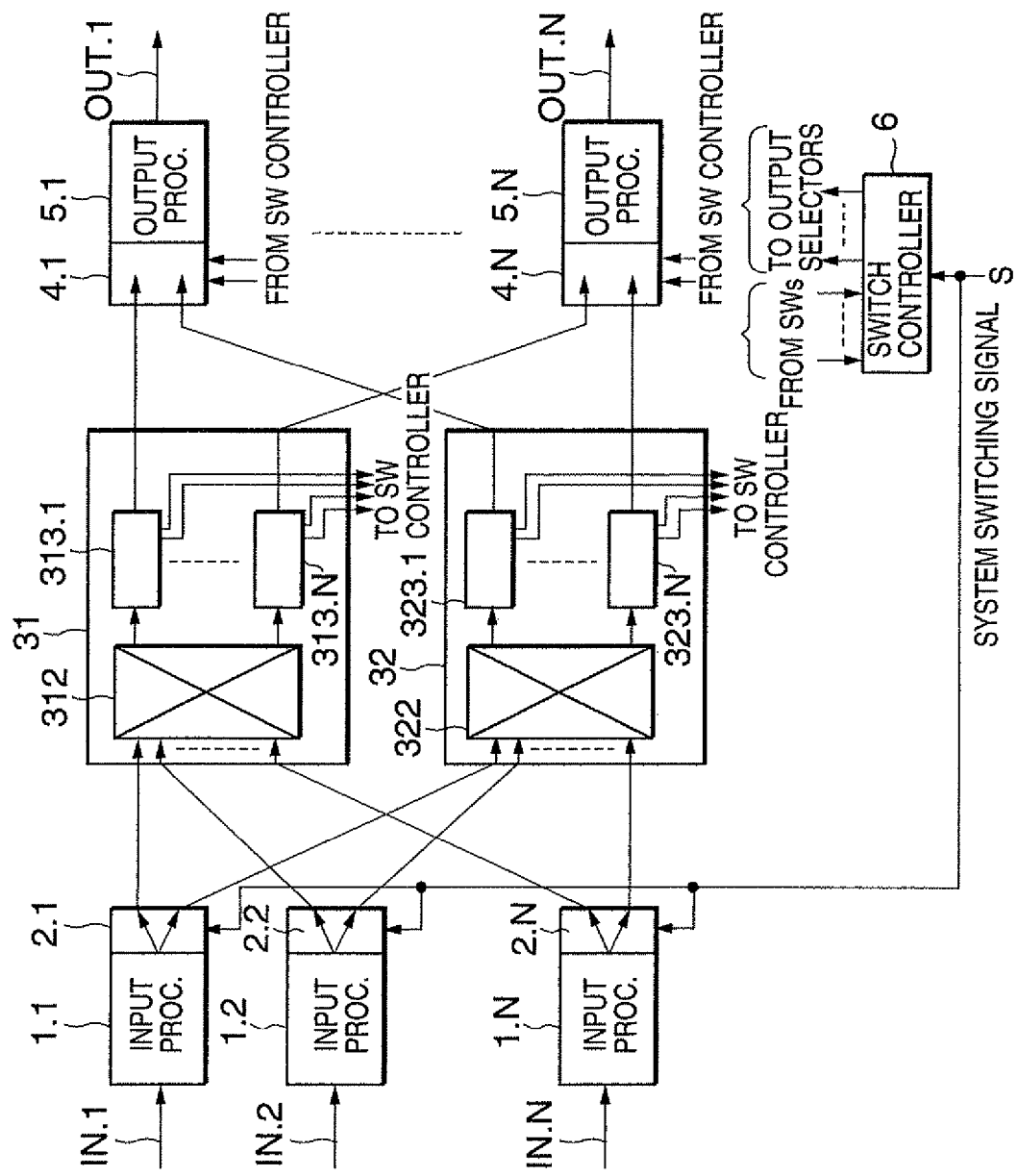
FIG. 1 is a block diagram showing a packet switching system according to an embodiment of the present invention.

As shown in FIG. 1, a packet switching system according to an embodiment of the present invention is provided with N (N is an integer greater than 0) input processors 1.1 to 1.N, which are connected to respective ones of N input lines IN.1 to IN.N. The respective input processors 1.1 to 1.N are connected to N input selector switches 2.1 to 2.N, each of which outputs a packet of data to a selected one of two switch sections 31 and 32.

Each of the switch sections 31 and 32 has N output ports corresponding to respective ones of N output lines OUT. 1 to OUT.N. More specifically, a pair of corresponding output ports of the switch sections 31 and 32 are connected to a corresponding one of N output selectors 4.1 to 4.N, which are connected to N output processors 5.1 to 5.N, respectively.

A switch controller 6 controls selection operations of the output selectors 4.1 to 4.N based on status signals received from the switch sections 31 and 32, which will be described later.

The respective input processors 1.1 to 1.N perform input processing of packets received from the input lines IN.1 to IN.N. The input processing includes: counting the number of packets; discarding packets going over the speed limit; checking the priority of a packet; and searching for destination port. The input selector switch, when receiving a packet from a corresponding input processor, outputs the packet to a selected one of the switch sections 31 and 32.

The switch section 31 includes an N×N switch fabric 312, which may be a crossbar switch or configured in bus form. The N input ports of the switch fabric 312 are connected to respective ones of the input selector switches 2.1 to 2.N. The N output ports of the switch fabric 312 are connected to respective ones of N output buffers 313.1 to 313.N. Similarly, the switch section 32 includes an N×N switch fabric 322, which may be a crossbar switch or configured in bus form. The N input ports of the switch fabric 322 are connected to respective ones of the input selector switches 2.1 to 2.N. The N output ports of the switch fabric 322 are connected to respective ones of N output buffers 323.1 to 323.N.

In this embodiment, each of the output buffers 313.1 to 313.N (or 323.1 to 323.N) includes M priority queues each corresponding to different priorities of packets, where M is an integer greater than 1. The priority of a packet indicates how fast the packet passes through the switch. In other words, a packet with higher priority is given priority in transfer to its destination port. A packet that requires a shorter delay time is a high-priority packet and one that does not require a shorter delay time is a low-priority packet. Therefore, a high-priority packet is expected to pass through the switch faster than a low-priority packet.

Each of the output processors 5.1 to 5.N receives a packet from a corresponding output selector and performs necessary processing of the packet to output it to a corresponding output line. The processing performed in the output processor includes counting the number of outgoing packets and controlling the transfer rate.

Hereinafter, it is assumed for simplicity that each of the output buffers 313.1 to 313.N (or 323.1 to 323.N) includes two priority queues: high-priority queue and low-priority queue. A high-priority packet is stored in the high-priority queue and a low-priority packet is stored in the low-priority queue in each output buffer.

Output Buffer

Since the output buffers 313.1 to 313.N (or 323.1 to 323.N) have the same circuit configuration, one of them will be described as a typical example with reference to FIG. 2.

Figure 2:
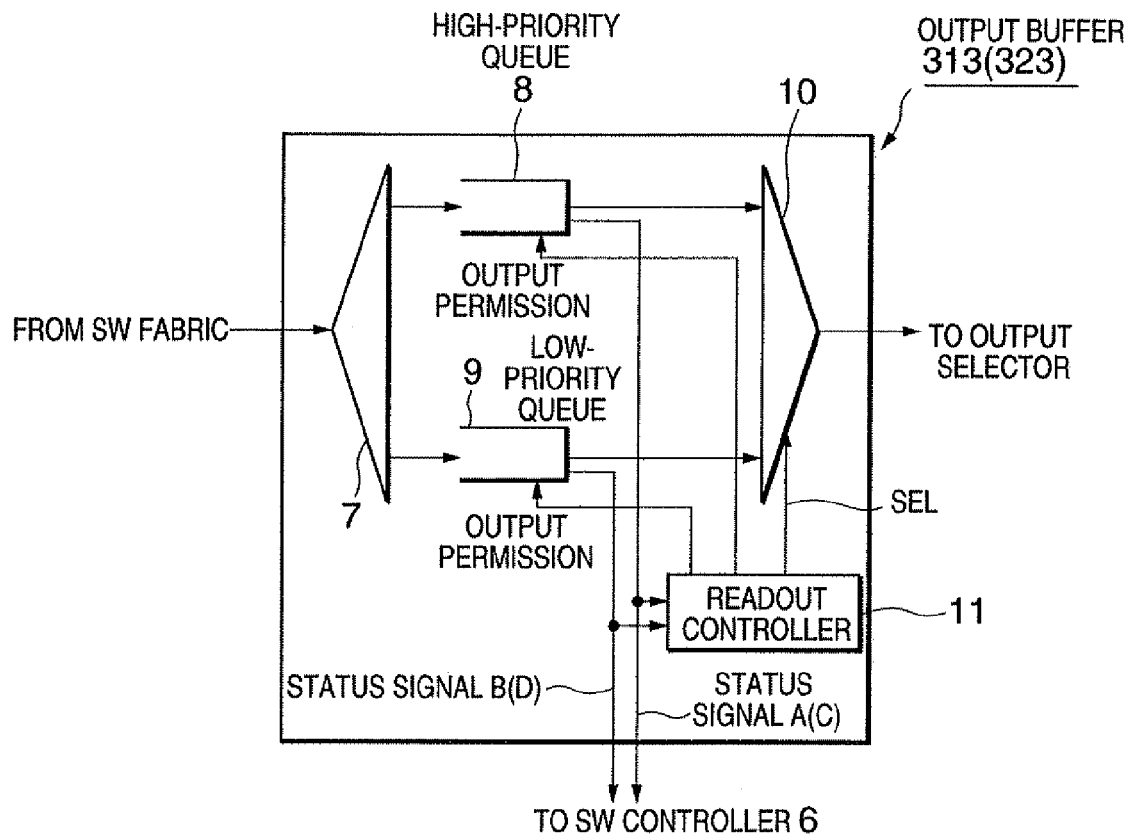
FIG. 2 is a block diagram showing an output buffer having a high-priority queue and a low-priority queue in the embodiment.

Referring to FIG. 2, the output buffer is provided with a distributor 7, a high-priority queue 8, a low-priority queue 9, a queue-output selector 10, and a readout controller 11.

The distributor 7 receives packets from a corresponding output port of the switch fabric and discriminates between a high-priority packet and a low-priority packet. The high-priority packet is stored in a high-priority queue 8 and the low-priority packet is stored in a low-priority queue 9. The distributor 7 does not necessarily check the header information of each packet to determine its priority. Each of the input processors 1.1 to 1.N reads the header of a packet to determine whether the packet is a high-priority packet or a low-priority packet and then adds to the packet internally effective bit information indicating whether the packet is a high-priority packet or a low-priority packet. Therefore, only by looking at the added bit information, the distributor 7 can discriminate between a high-priority packet and a low-priority packet.

The high-priority queue 8 and the low-priority queue 9 output respective status signals to the readout controller 11 and the switch controller 6. The status signal of the high-priority queue 8 or the low-priority queue 9 indicates an empty status when no packet is stored therein.

The high-priority queue 8 and the low-priority queue 9 output respective packets to the queue-output selector 10 depending on output permission signals received from the readout controller 11. More specifically, only when the output permission signal is received, a corresponding queue outputs a stored packet to the queue-output selector 10. If the output permission signal is not received, then the corresponding queue does not output any packet to the queue-output selector 10.

The readout controller 11 outputs the output permission signals to respective ones of the high-priority queue 8 and the low-priority queue 9 and further outputs a selection signal SEL to the queue-output selector 10, depending on the status signals received from respective ones of the high-priority queue 8 and the low-priority queue 9. The queue-output selector 10 selects one of the outputs of the high-priority queue 8 and the low-priority queue 9 depending on the selection signal SEL. For example, when the readout controller 11 outputs the output permission signal to the high-priority queue 8, the readout controller 11 outputs the selection signal SEL to the queue-output selector 10 so that the output of the high-priority queue 8 is selected. Similarly, when the output permission signal output to the low-priority queue 9, the queue-output selector 10 selects the output of the low-priority queue 9. A packet selected by the queue-output selector 10 in an output buffer is output to a corresponding output selector.

Example I of Readout Control

In the case where one of the high-priority queue 8 and the low-priority queue 9 does not output the empty status signal, in other words, the one stores at least one packet and the other is empty, the readout controller 11 outputs the output permission signal only to the one of the high-priority queue 8 and the low-priority queue 9 and thereby the one is permitted to output a packet to the queue-output selector 10.

In the case where neither the high-priority queue 8 nor the low-priority queue 9 outputs the empty status signal, the readout controller 11 outputs the output permission signal only to the high-priority queue 8. Accordingly, when the high-priority queue 8 and the low-priority queue 9 both store at least one packet, only the high-priority queue 8 is permitted to output a packet to the queue-output selector 10 and the low-priority queue 8 is not permitted to output a packet until the high-priority queue 8 has completely output the abiding packets. In other words, after the high-priority queue 8 becomes empty, that is, the high-priority queue 8 outputs the empty status signal, the output permission signal is output to the low-priority queue 8.

According to this readout control method, in the case of the high-priority queue 8 storing packets, the packets stored in the high-priority queue 8 are given priority in transfer independently of the status of the low-priority queue 9. After all the abiding packets have been completely transferred from the high-priority queue 8, packets stored in the low-priority queue 9 are output to the queue-output selector 10.

Example II of Readout Control

In the case where one of the high-priority queue 8 and the low-priority queue 9 does not output the empty status signal, in other words, the one stores at least one packet and the other is empty, the readout controller 11 outputs the output permission signal only to the one of the high-priority queue 8 and the low-priority queue 9 and thereby the one is permitted to output a packet to the queue-output selector 10.

In the case where neither the high-priority queue 8 nor the low-priority queue 9 outputs the empty status signal, the readout controller 11 outputs the output permission signal to the high-priority queue 8 so that M packets are output from the high-priority queue 8 and outputs the output permission signal to the low-priority queue 9 so that N packets are output from the low-priority queue 9, where M>N. Accordingly, when the high-priority queue 8 and the low-priority queue 9 both store at least one packet, packets are read out from the high-priority queue 8 more frequently than from the low-priority queue 9. therefore, compared with low-priority packets, high-priority packets pass through the switch with smaller delay.

Although the readout control is performed based on the number of packets transferred, it can be also performed based on the number of bytes of packets transferred.

Either of the above-described readout control methods can be employed in the present invention. Another readout control method of giving priority in transfer to high-priority packets may be employed.

Output Selector

Since the output selectors 4.1 to 4.N have the same circuit configuration, one of them will be described as a typical example with reference to FIG. 3.

Figure 3:
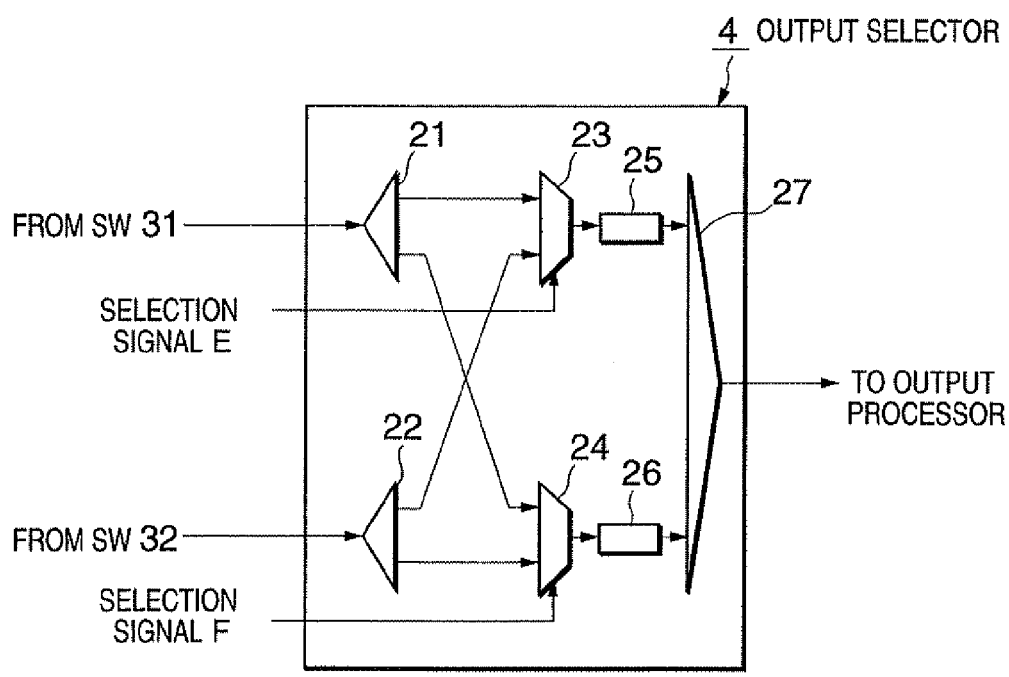
FIG. 3 is a block diagram showing an output selector in the embodiment.

Referring to FIG. 3, the output selector is provided with distributors 21 and 22, which are connected to respective ones of the switch sections 31 and 32. A high-priority packet selector 23 is connected to the outputs of the distributors 21 and 22 and outputs only high-priority packets to a high-priority queue 25. A low-priority packet selector 24 is connected to the outputs of the distributors 21 and 22 and outputs only low-priority packets to a low-priority queue 26. The outputs of the high-priority queue 25 and the low-priority queue 26 are connected to a readout section 27.

The distributor 21 receives packets from the switch section 31 and discriminates between a high-priority packet and a low-priority packet. The high-priority packet is output to the high-priority packet selector 23 and the low-priority packet is output to the low-priority packet selector 24. Similarly, the distributor 22 receives packets from the switch section 32 and discriminates between a high-priority packet and a low-priority packet. The high-priority packet is output to the high-priority packet selector 23 and the low-priority packet is output to the low-priority packet selector 24. As the case of the distributor 7 in the output buffer as shown in FIG. 2, the distributors 21 and 22 can discriminate between a high-priority packet and a low-priority packet only by looking at the added bit information of the packet.

The high-priority packet selector 23 selects one of high-priority packets received from the switch sections 31 and 32 to output it to the high-priority queue 25 depending on a selection signal E received from the switch controller 6. Similarly, the low-priority packet selector 24 selects one of low-priority packets received from the switch sections 31 and 32 to output it to the low-priority queue 26 depending on a selection signal F received from the switch controller 6. In other words, the high-priority packet selector 23 finally determines the switching timing of high-priority packet between the switch sections 31 and 32 and the low-priority packet selector 24 finally determines the switching timing of low-priority packet between the switch sections 31 and 32. In this way, high-priority packets stored in the high-priority queue 25 and low-priority packets stored in the low-priority queue 26 are read out and output to a corresponding output processor by the readout section 27.

Switch Controller

Figure 4:
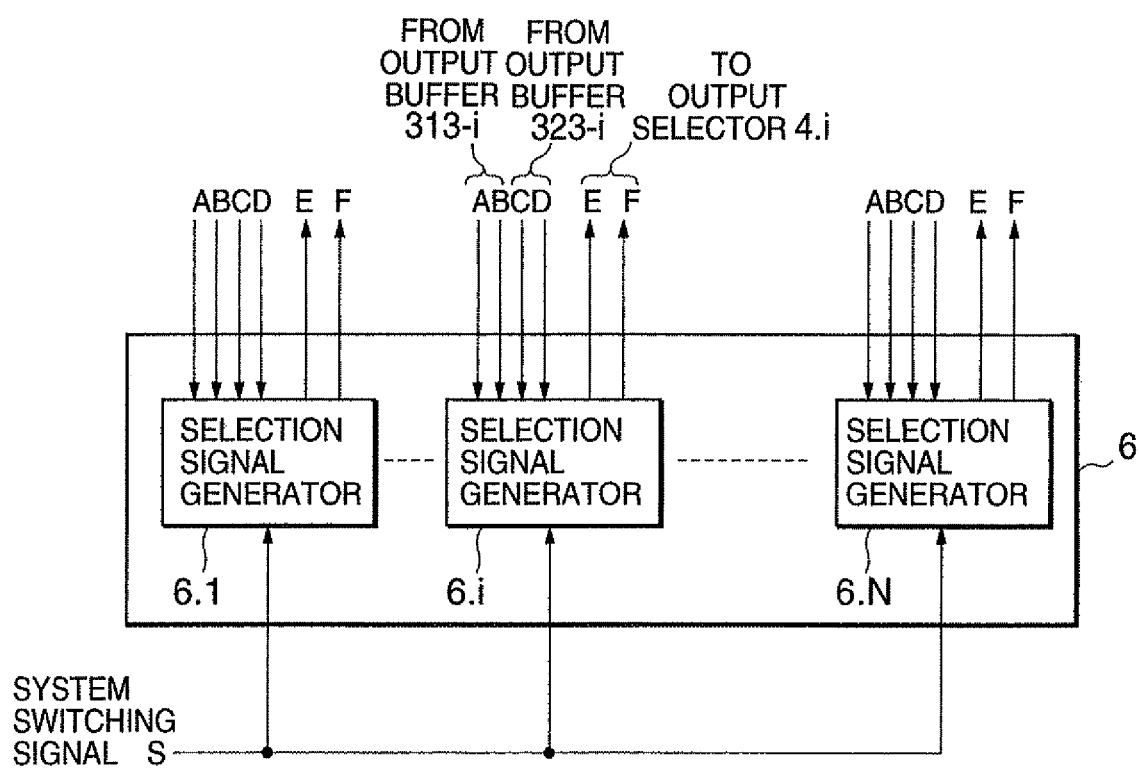
FIG. 4 is a block diagram showing a switch controller in the embodiment.

Referring to FIG. 4, the switch controller 6 includes N selection signal generators 6.1 to 6.N, which correspond to the output selectors 4.1 to 4.N, respectively. The selection signal generators 6.$i$ ($i$ is an integer: $1 \leq i \leq N$) receives high-priority and low-priority status signals A and B from the output buffer 313.$i$ of the switch section 31, high-priority and low-priority status signals C and D from the output buffer 323.$i$ of the switch section 32, and a system switching signal S instructing the switching between the switch sections 31 and 32. The selection signal generators 6.$i$ generates the selection signals E and F based on the status signals A, B, C, and D and the system switching signal S to output them to the output selector 4.$i$.

Selection Signal Generation

Figure 5:
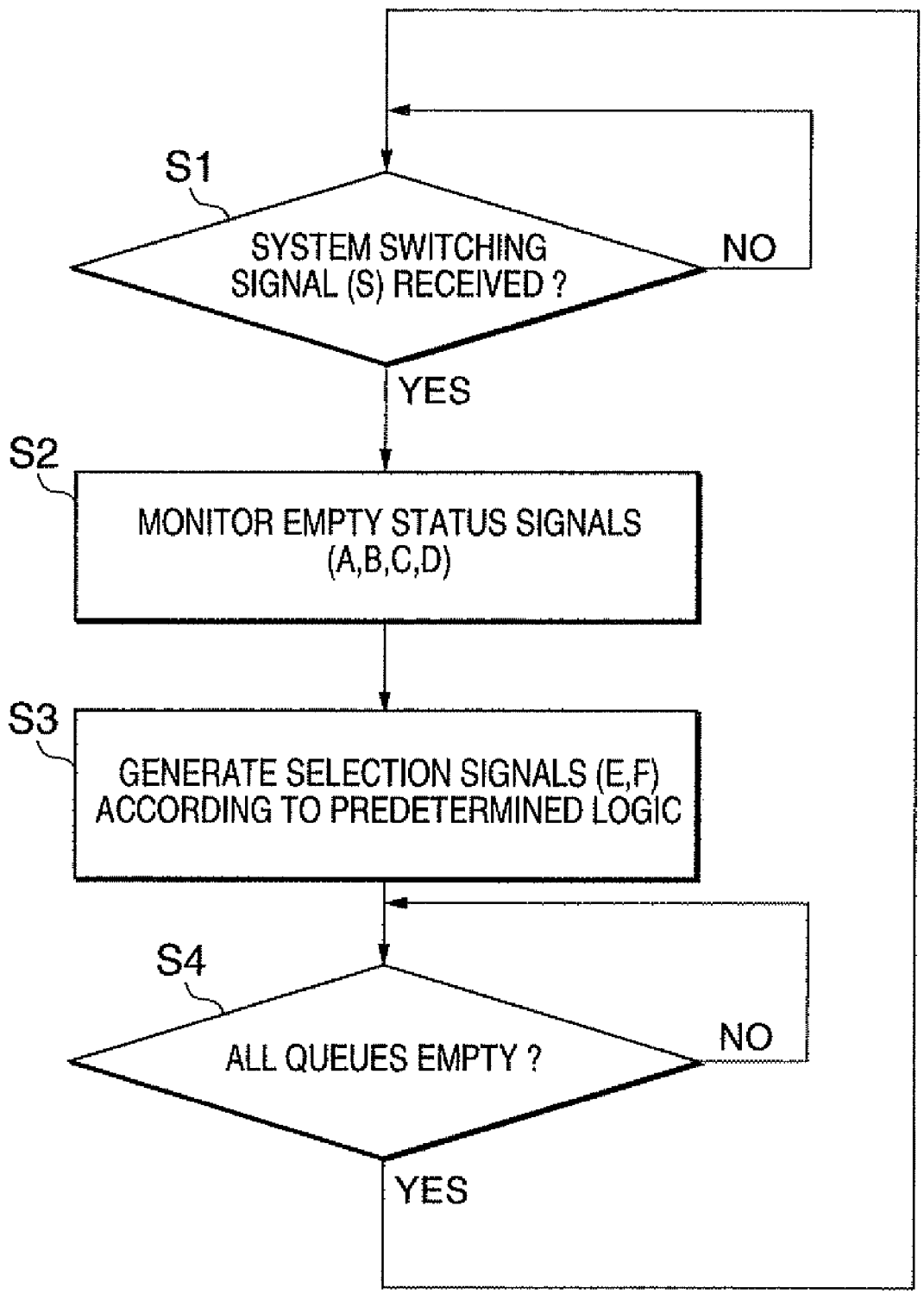
FIG. 5 is a flow chart showing an operation of forming a selection signal in the embodiment.

Referring to FIG. 5, the selection signal generator 6.1 determines whether the system switching signal S is received (step S1). When the system switching signal S is received (YES at step S1), the selection signal generator 6.$i$ monitors the high-priority and low-priority status signals A and B of the output buffer 313.$i$ and the high-priority and low-priority status signals C and D of the output buffer 323.$i$ (step S2). The selection signal generators 6.$i$ generates selection signals E and F according to predetermined logic as shown in Table (step S3). Thereafter, it is determined whether the high-priority and low-priority queues of a corresponding output buffer become empty (step S4) and, if all queues are empty, then control goes back to the step S1.

TABLE

| | Input | | | | Output | |
| --- | --- | --- | --- | --- | --- | --- |
| | Working queue status | | Reserved queue status | | High-pr | Low-pr |
| S | High-pr A | Low-pr B | High-pr C | Low-pr D | selection signal E | selection signal F |
| 1 | 0 → 1 | — | — | — | 0 → 1 | — |
|   | — | 0 → 1 | — | — | — | 0 → 1 |
| 0 | — | — | 0 → 1 | — | 1 → 0 | — |
|   | — | — | — | 0 → 1 | — | 1 → 0 |

In the above Table, when the system switching signal S=1, the selection signal generator 6.$i$ is instructed to switch to the reserved system (switch section 32) and, when S=0, to the working system (switch section 31). In the case of S=1, for example, when the high-priority queue 8 of the output buffer 313.1 becomes empty, the high-priority queue status signal A is changed from 0 to 1 and the selection signal generators 6.1 changes the selection signal E from 0 to 1. When the selection signal E=1, the high-priority packet selector 23 of the output selector 4.1 selects the output of the distributor 22 corresponding to the reserved switch section 32 (see FIG. 3). Accordingly, a high-priority packet passing through the switch section 32 is stored in the high-priority packet queue 25 in the output selector 4.1.

In the case of S=1, if the low-priority queue 9 of the output buffer 313.1 becomes empty, the low-priority queue status signal B is changed from 0 to 1 and the selection signal generators 6.1 changes the selection signal F from 0 to 1. When the selection signal F=1, the low-priority packet selector 24 of the output selector 4.1 selects the output of the distributor 22 corresponding to the reserved switch section 32 (see FIG. 3). Accordingly, a low-priority packet passing through the switch section 32 is stored in the low-priority packet queue 26 in the output selector 4.1.

In this manner, each of the selection signal generators 6.1 to 6.N of the switch controller 6 generates selection signals E and F based on the status signals A, B, C, and D and the system switching signal S to control the switching of the high-priority and low-priority packet selectors 23 and 24 of a corresponding output selector.

Packet Switching Operation

Hereafter, a packet switching operation in the redundant system as shown in FIG. 1 will be described with reference to FIGS. 6-8. It is assumed for simplicity that a packet received from the input line IN.1 is switched from the working switch section 31 to the reserved switch section 32 to be forwarded to the output line OUT.1.

The output buffer 313.1 of the switch section 31 receives packets from a corresponding output port of the switch fabric and selectively stores the packets in the high-priority queue 8 and the low-priority packet 9 depending on the priority of each packet. The queue-output selector 10 reads out packets from a selected one of the high-priority queue 8 and the low-priority packet 9 according to a predetermined readout control method as described before. The readout packet is output to the output selector 4.1.

Figure 6:
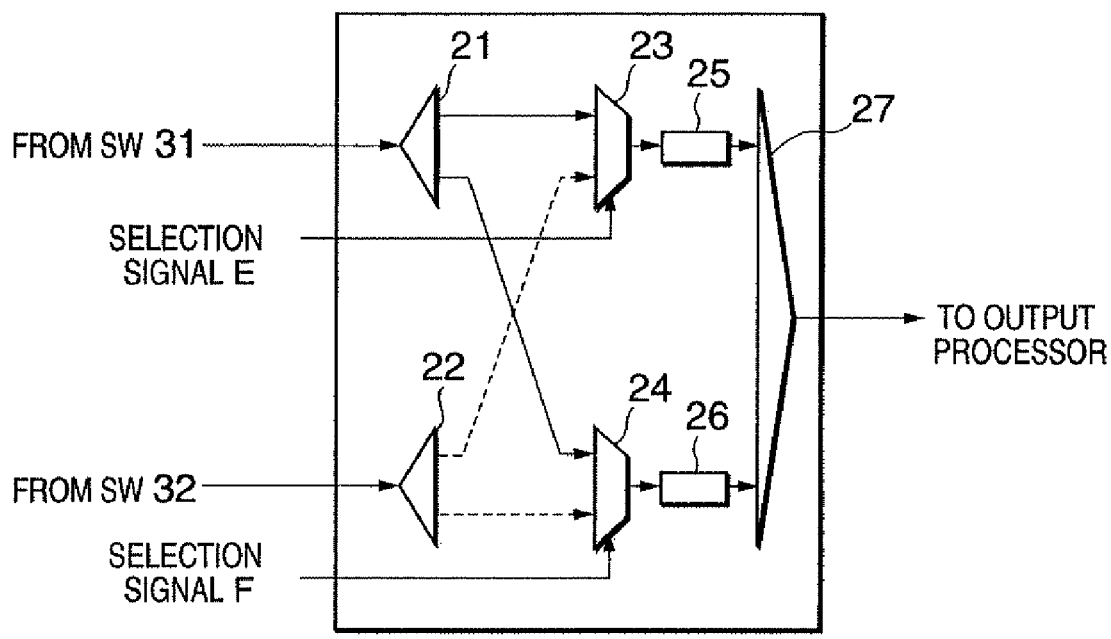
FIGS. 6-8 are block diagrams each showing the output selector for explanation of a packet switching operation according to the embodiment.

As shown in FIG. 6, the output selector 4.1 is set to such a status that the high-priority packet selector 23 and the low-priority packet selector 24 both select the outputs of the distributor 21 corresponding to the working switch section 31. Therefore, a high-priority packet output from the distributor 21 is stored in the high-priority packet queue 25 through the selector 23 and a low-priority packet output from the distributor 21 is stored in the low-priority packet queue 26 through the selector 24.

Assuming that the system switching signal S is changed to 1 in this status, the input selector switch 2.1 switches the forwarding destination of a received packet from the working switch section 31 to the reserved switch section 32 (see FIG. 1). After having switched to the reserved switch section 32, packets are selectively stored in the high-priority queue 8 and the low-priority packet 9 in the output buffer 323.1 of the reserved switch section 32 depending on the priority of each packet. At the same time, the packets stored in the buffers 8 and 9 of the working switch section 31 continue to be read out according to the predetermined readout control method and are stored in a corresponding one of the high-priority packet queue 25 and the low-priority packet queue 26.

When the switch controller 6 determines that the system switching signal S=1 is received (see step S1 of FIG. 5), the switch controller 6 monitors the high-priority queue and low-priority queue status signals A and B (step S2 of FIG. 5).

In the case where both the high-priority queue 8 and the low-priority packet 9 of the output buffer 313.1 store packets, the packets stored in the high-priority queue 8 are given priority in transfer as described before. When the high-priority queue 8 becomes empty and thereby outputs the empty status signal to the switch controller 6, the selection signal generator 6.1 of the switch controller 6 generates the selection signal E=1 according to the logic shown in the Table (step S3 of FIG. 5).

Figure 7:
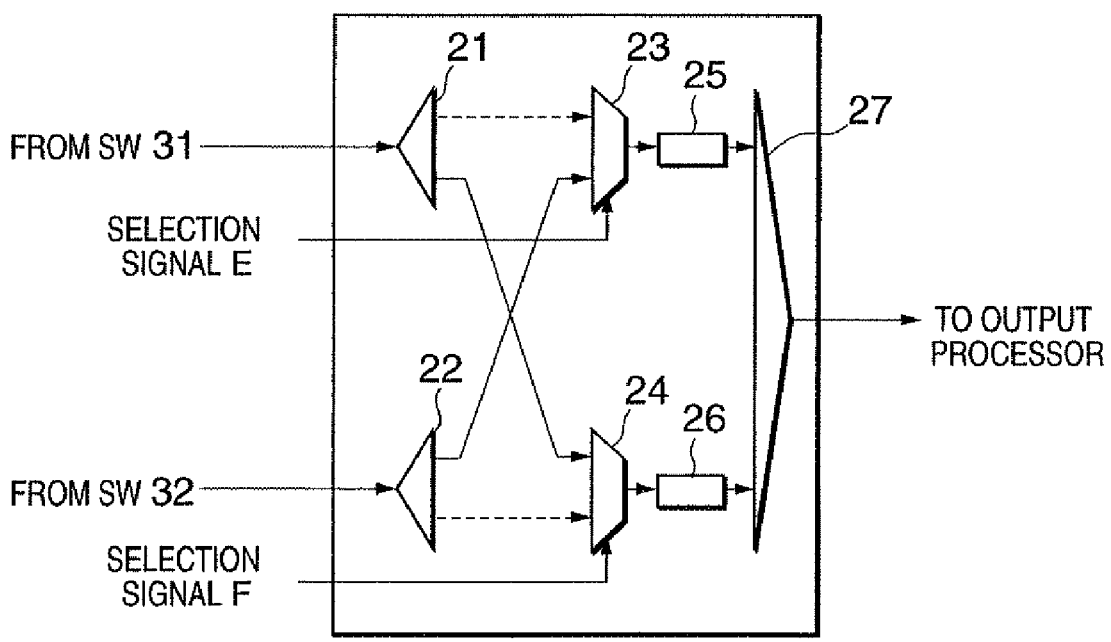

As shown in FIG. 7, when receiving the selection signal E=1, the selector 23 of the output selector 4.1 is changed to such a status that a high-priority packet is received from the distributor 22 corresponding to the reserved switch section 32. Accordingly, the high-priority packets stored in the high-priority queue 8 of the output buffer 323.1 in the reserved switch section 32 are distributed to the selector 23 by the distributor 22 and stored in the high-priority packet queue 25. In other words, from the viewpoint of a high-priority packet, a switch to be passed through is switched from the working switch section 31 to the reserved switch section 32. Therefore, when the system is switched from working to reserved, a high-priority packet passes through the switch without staying in the reserved switch section 32 for a long time, resulting in a small amount of delay.

When the low-priority queue 9 becomes empty and thereby outputs the empty status signal to the switch controller 6, the selection signal generator 6.1 of the switch controller 6 generates the selection signal F=1 according to the logic shown in the Table (step S3 of FIG. 5).

Figure 8:
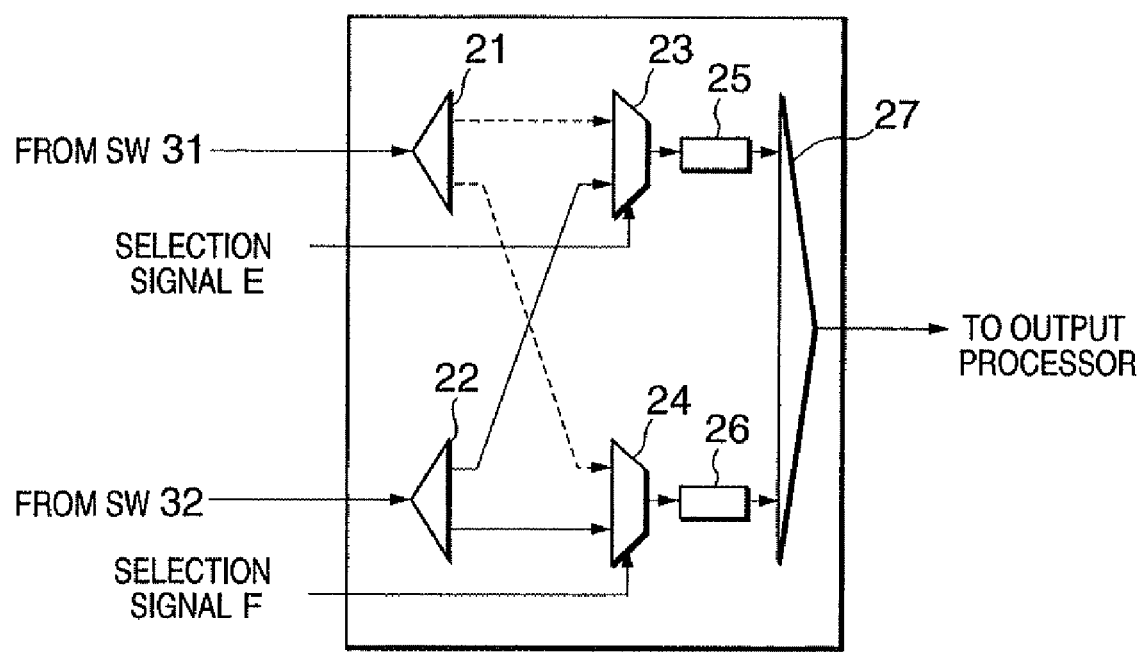

As shown in FIG. 8, when receiving the selection signal F=1, the selector 24 of the output selector 4.1 is changed to such a status that a low-priority packet is received from the distributor 22 corresponding to the reserved switch section 32. Accordingly, the low-priority packets stored in the low-priority queue 9 of the output buffer 323.1 in the reserved switch section 32 are distributed to the selector 24 by the distributor 22 and stored in the low-priority packet queue 26. In other words, from the viewpoint of a low-priority packet, a switch to be passed through is switched from the working switch section 31 to the reserved switch section 32.

In this manner, the switching timing between working and reserved switch sections varies depending on the priority of a packet. More specifically, the higher the priority of a packet, the earlier the switching timing. Therefore, traffic flows requiring real-time transfer can be switched with little delay.

The above-described operation is performed in each of the output buffers. In this embodiment, two kinds of queues (high-priority and low-priority queues) are provided for each output buffer. It is possible to define three or more priority classes by providing three or more kinds of queues in each output buffer.

Although the buffer is provided at the output side of the switch fabric in the above embodiment, it is possible to provide the buffer at the input side of the switch fabric.

The invention claimed is:

1. A system comprising:
   first and second switch routes;
   a plurality of input selectors, each for receiving an input line and for connecting the received input line to one of the two switch routes;
   a switch section for each one of the two switch routes, each of the switch sections including:
   N input ports,
   N output ports, and
   N buffers that each further include M priority queues to store data units having different priorities, where M is greater than or equal to two;
   an output selector to receive first and second data units, where the first data unit is from the M priority queues of the N buffers of the first switch section, and the second data unit is from the M priority queues of the N buffers of the second switch section; and
   a controller to:
   generate a system switching signal, and
   receive status signals from both of the switch sections, where a particular status signal from a particular switch section, of the switch sections, includes information relating to a data unit storing status of the M priority queues of the particular switch section and, based on the status signals, control the output selector to selectively output one of the first or second received data units.

2. The system of claim 1, where the plurality of input selectors connect the received input lines to one of the two switch routes based on the system switching signal.

3. The system of claim 1, where when the controller controls the output selector to switch from outputting data units from the first switch route to the second switch route, the controller monitors a data unit storing status of each of the M priority queues of the first switch route and, when the M priority queues of the second switch route become empty, the controller instructs the output selector to select one of the priority queues from the first switch route.

4. The system according to claim 1, where each of the switch sections further comprise:
   a readout controller controlling a data unit reading sequence of the M priority queues for each of the N buffers such that priority in data unit reading is given to a higher priority queue.

5. The system of claim 1, where the controller instructs the output selector to sequentially select the M priority queues in descending order of priority.

6. A system comprising:
   two switch routes;
   a plurality of input selectors for connecting input lines to one of the two switch routes;
   a switch section provided for each of the two switch routes, each of the switch sections comprising:
      N input ports,
      N output ports, and
      N buffers, each of the N buffers further including:
         a high-priority queue for storing input data units having a high priority,
         a high-priority output selector coupled to the high-priority queue,
         a low-priority queue for storing input data units having a low priority, and
         a low-priority output selector coupled to the low-priority queue; and
   a controller to:
      generate a system switching signal, and
      receive status signals from each of the two switch sections, where the status signals include information relating to a storage status of the high-priority queues and the low-priority queues, the controller controlling the high-priority output selectors and the low-priority output selectors depending on the status signals.

7. The system of claim 6, further comprising:
   a high-priority output queue for storing an output of the high-priority output selector; and
   a low-priority output queue for storing an output of the low-priority output selector.

8. The system of claim 7, where when one of the two switch routes is switched to the other of the two switch routes, the controller monitors a data unit storing status of each of the high-priority and low-priority queues and, if one of the high-priority queues corresponding to respective ones of the two switch sections becomes empty, then the controller instructs a high-priority output selector to select an other of the high-priority queues to store an output of the selected high priority queue into the high-priority output queue.

9. The system of claim 6, where each of the switch sections further comprises:
   a readout controller controlling a data unit reading sequence of the high-priority and low-priority queues for each of the N buffers such that priority in data unit reading is given to the high-priority queue.

10. The system of claim 9, where the readout controller starts reading out the low-priority data units stored in the low-priority queue after all of the high-priority data units stored in the high-priority queue have been completely read out.

11. The system of claim 9, where the readout controller controls a data unit reading sequence of the high-priority and low-priority queues for each of the N buffers such that high-priority data units are read out from the high-priority queue and low-priority data units are read out from the low-priority queue.

12. A switching system comprising:
   a plurality of input selector switches each connected to an input line;
   a first switch section and a second switch section connected to the plurality of input selector switches, one of the first switch section or the second switch section receiving data units from the plurality of input selector switches, the first and second switch sections each including a buffer corresponding to each of the plurality of input selector switches, each of the buffers further including a plurality of priority queues for storing different priority data units from corresponding ones of the plurality of input selector switches;
   output selectors to receive data units output from the first and second switch sections; and
   a controller to:
      generate a system switching signal, and
      receive status signals from the first switch section and the second switch section, where the status signals include information relating to a state of the first switch section and the second switch section, where the controller controls the plurality of output selectors based on the received status signals.

13. The switching system of claim 12, where the output selectors are to receive data units from one of the priority queues corresponding to the buffer to which an output selector is connected.

14. The switching system of claim 12, where the input selector switches are each connected to an input line via an input processor.

15. The switching system of claim 12, where a number of the output selectors is equal to a number of the input selector switches.

16. The system of claim 1, further comprising:
   a plurality of output selectors, where the plurality of output selectors includes N output selectors, where the output selector is one of the N output selectors.

17. The system of claim 16, where the plurality of output selectors consists of exactly N output selectors.

18. The system of claim 1, where the plurality of input selectors includes N input selectors.

19. The system of claim 1, where each of the switch sections further includes an N×N switch fabric.

20. The system of claim 1, where a particular input selector is to receive a data unit and append priority information to the data unit.

21. The system of claim 4, where the readout controller of a particular switch section, of the switch sections, operates based on a status signal received from the M priority queues of the particular switch section.

* * * * *